United States Patent
Anglin et al.

(10) Patent No.: US 10,215,054 B2
(45) Date of Patent: Feb. 26, 2019

(54) SECONDARY SEALING SYSTEM

(71) Applicant: United Technologies Corporation, Hartford, CT (US)

(72) Inventors: Christopher Anglin, Manchester, CT (US); Yuk-Kwan Yuen, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 245 days.

(21) Appl. No.: 14/856,072

(22) Filed: Sep. 16, 2015

(65) Prior Publication Data

US 2016/0169040 A1 Jun. 16, 2016

Related U.S. Application Data

(60) Provisional application No. 62/092,678, filed on Dec. 16, 2014.

(51) Int. Cl.
| | |
|---|---|
| *F01D 5/02* | (2006.01) |
| *F01D 25/18* | (2006.01) |
| *F16J 15/3232* | (2016.01) |
| *F16J 15/3284* | (2016.01) |
| *F04D 29/10* | (2006.01) |
| *F01D 11/00* | (2006.01) |

(52) U.S. Cl.
CPC ........... *F01D 25/183* (2013.01); *F01D 5/026* (2013.01); *F01D 11/00* (2013.01); *F04D 29/102* (2013.01); *F16J 15/3232* (2013.01); *F16J 15/3284* (2013.01); *F05D 2220/30* (2013.01); *F05D 2240/55* (2013.01)

(58) Field of Classification Search
None
See application file for complete search history.

(56) References Cited

U.S. PATENT DOCUMENTS

| | | | |
|---|---|---|---|
| 3,120,463 A | | 2/1964 | Russell |
| 3,970,398 A | * | 7/1976 | Wilson ............... F01D 5/026 403/13 |
| 5,211,535 A | * | 5/1993 | Martin ............... F01D 11/02 277/413 |

(Continued)

FOREIGN PATENT DOCUMENTS

| | | |
|---|---|---|
| EP | 2955260 | 12/2015 |
| EP | 3073004 | 9/2016 |
| WO | 9928122 | 6/1999 |

OTHER PUBLICATIONS

Extended European Search Report dated Jun. 22, 2016 in European Application No. 15200557.5.

(Continued)

*Primary Examiner* — Jason D Shanske
*Assistant Examiner* — Theodore C Ribadeneyra
(74) *Attorney, Agent, or Firm* — Snell & Wilmer L.L.P.

(57) ABSTRACT

The present disclosure includes sealing systems comprising a secondary seal with one or more of a knife edge seal and a discourager. The secondary seal may act to isolate an interface between an inner and outer shaft and a bearing compartment. The inner and outer shafts may be high pressure compressor and low pressure turbine shafts, respectively.

17 Claims, 4 Drawing Sheets

(56) References Cited

U.S. PATENT DOCUMENTS

| | | | | |
|---|---|---|---|---|
| 5,301,957 A * | 4/1994 | Hwang | ............... | F16C 33/76 |
| | | | | 277/350 |
| 6,619,908 B2 * | 9/2003 | Bruno | ............... | F01D 11/02 |
| | | | | 415/1 |
| 7,435,052 B2 * | 10/2008 | Spencer | ............... | F01D 11/02 |
| | | | | 415/229 |
| 7,726,021 B2 * | 6/2010 | Barnett | ............... | B23P 6/005 |
| | | | | 277/412 |

OTHER PUBLICATIONS

Extended European Search Report dated Dec. 6, 2017 in European Application No. 17187449.8.

* cited by examiner

SECONDARY SEALING SYSTEM

This application is a nonprovisional of, and claims priority to, and the benefit of U.S. Provisional Application No. 62/092,678, entitled "SECONDARY SEALING SYSTEM," filed on Dec. 16, 2014, which is hereby incorporated by reference in its entirety.

FIELD

The present disclosure relates generally to systems for sealing portions of a gas turbine engine and, more specifically, to sealing systems configured to reduce fluid entry into an interface between concentric shafts within a gas turbine engine.

BACKGROUND

Conventional gas turbine engines include a bearing compartment that houses a number of bearings providing support to a number of shafts. Within the bearing compartment, an interface between an inner and outer shaft may be positioned in a separate annulus. This annulus may be sealed from the bearing compartment by an intershaft seal. However, oil or other liquids may pass through the intershaft seal and interact with the interface between the inner and outer shaft. This oil may pose a safety hazard. Accordingly, improved sealing systems may be desirable.

SUMMARY

A sealing system in accordance with the present disclosure may include an intershaft seal separating a bearing compartment from an annulus, an outer shaft concentrically surrounding at least a portion of an inner shaft, wherein an interface between the outer shaft and the inner shaft is located within the annulus, and a secondary seal positioned within the annulus. The secondary seal may be configured to prevent a lubricating oil in the annulus from entering the interface. The secondary seal may comprise at least one knife edge seal and/or at least one discourager. The intershaft seal may be configured to prevent a lubricating oil in the bearing compartment from entering the annulus. An oil drain may be located in the annulus. The intershaft seal may comprise a buffer air inlet. The outer shaft may comprise a high pressure compressor shaft, and the inner shaft may comprise a low pressure turbine shaft.

A gas turbine engine in accordance with the present disclosure may include an intershaft seal separating a bearing compartment from an annulus and configured to prevent a lubricating oil in the bearing compartment from entering the annulus, an outer shaft concentrically surrounding at least a portion of an inner shaft, wherein an interface between the outer shaft and the inner shaft is located within the annulus, and a secondary seal positioned within the annulus and configured to prevent the lubricating oil in the annulus from entering the interface. The secondary seal may include at least one of a knife edge seal and a discourager. An oil drain may be located in the annulus. The intershaft seal may comprise a buffer air inlet. The outer shaft comprises a high pressure compressor shaft. The inner shaft may comprise a low pressure turbine shaft.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

As used herein, "aft" refers to the direction associated with the tail of an aircraft, or generally, to the direction of exhaust of the gas turbine. As used herein, "fore" refers to the direction associated with the nose of an aircraft, or generally, to the direction of flight or motion.

The present disclosure describes devices and systems for sealing an annulus of a bearing component from an interface of concentric high pressure compressor and low pressure turbine shafts. As will be described in more detail, in various embodiments, systems comprising a secondary seal positioned between an intershaft seal and the shaft interface are provided herein.

Figure 1:
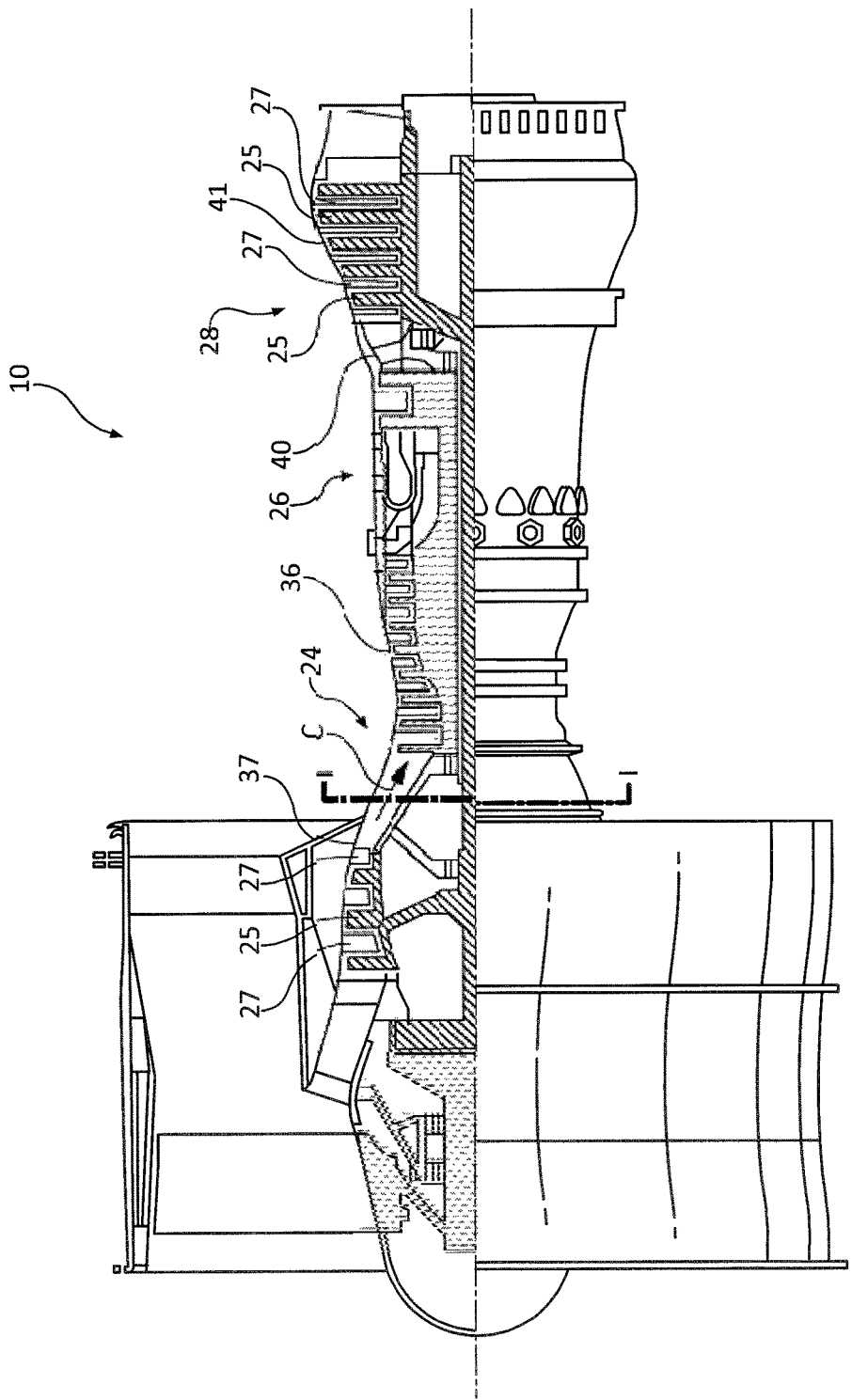
FIG. 1 illustrates a perspective view of an aircraft engine in accordance with the present disclosure.

With reference to FIG. 1, a gas turbine engine 10 is shown. In general terms, gas turbine engine 10 may comprise a compressor section 24. Air may flow through compressor section 24 and into a combustion section 26, where it is mixed with a fuel source and ignited to produce hot combustion gasses. These hot combustion gasses may drive a series of turbine blades within a turbine section 28, which in turn drive, for example, one or more compressor section blades mechanically coupled thereto. Turbine section 28 may comprise, for example, a high pressure turbine section 40. Compressor section 24 may comprise a high pressure compressor section 36.

Each of the compressor section 24 and the turbine section 28 may include alternating rows of rotor assemblies and vane assemblies (shown schematically) that carry airfoils that extend into the core flow path C. For example, the rotor assemblies may carry a plurality of rotating blades 25, while each vane assembly may carry a plurality of vanes 27 that extend into the core flow path C. The blades 25 create or extract energy (in the form of pressure) from the core airflow that is communicated through the gas turbine engine 10 along the core flow path C. The vanes 27 direct the core airflow to the blades 25 to either add or extract energy.

Figure 2:
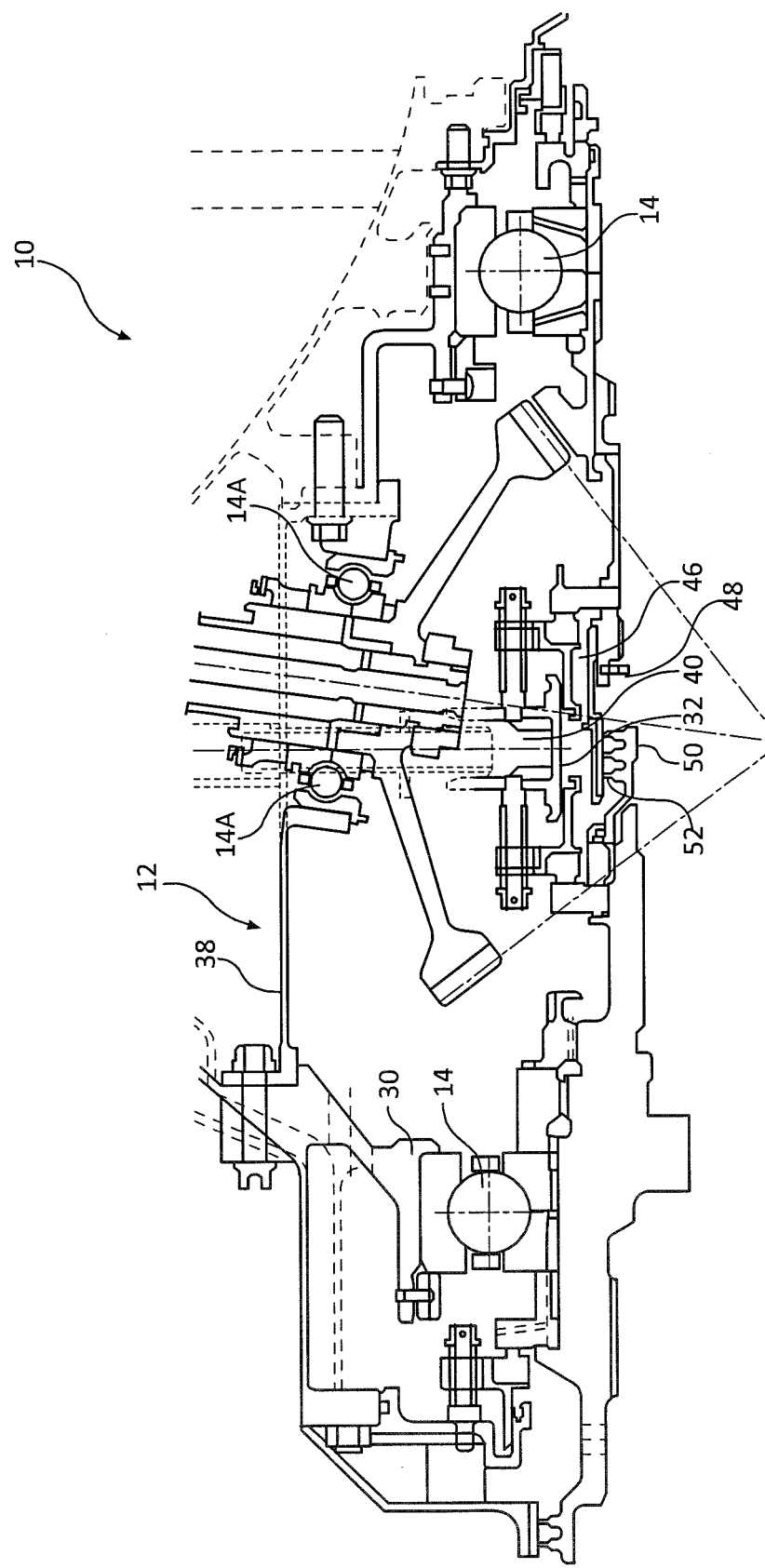
FIG. 2 illustrates a cross sectional view of a portion of an aircraft engine in accordance with the present disclosure

With reference to FIG. 2, a portion of gas turbine engine 10 along the axis I-I is illustrated. Gas turbine engine 10 may comprise, for example, a bearing compartment 12, bearings 14 and 14A, a high pressure compressor shaft 16, a low pressure turbine shaft 18, a tower shaft, a cross-over housing 30, and an intershaft seal assembly 32. As depicted in FIG. 1, bearings 14 and 14A each comprise a single bearing which extend inwardly and outwardly from the page.

In various embodiments, bearing compartment 12 may be a mid-bearing compartment of gas turbine engine 10. Bearing compartment 12 may house bearings 14 and 14A, which are disposed around and support a high pressure compressor shaft 16, a low pressure turbine shaft 18, and/or a tower shaft. In particular, bearings 14 may support high pressure compressor shaft 16 and low pressure turbine shaft 18. Bearings 14A may, for example, support a tower shaft. High pressure compressor shaft 16 may, for example, concentrically surround and be spaced apart from low pressure turbine shaft 18 (in such configurations, high pressure compressor shaft 16 is an outer shaft and low pressure turbine shaft 18 is an inner shaft).

In various embodiments, an outer housing 30 extends annularly around and is disposed around components such as bearings 14. Outer housing 30 may, for example, extend radially from the adjacent casing and may connect to cross-over housing 38. Cross-over housing 38 may extend from outer housing 30 and interface and support bearings 14A disposed around a tower shaft. In various embodiments, intershaft seal assembly 32 is disposed radially inward of cross-over housing 30 and bearing compartment 12.

With reference to FIGS. 1-3A, high pressure compressor shaft 16 may, for example, connect high pressure compressor section 36 of gas turbine engine 10 (illustrated in FIG. 1) with high pressure turbine section 40 (illustrated in FIG. 1). Together, high pressure compressor shaft 16, high pressure compressor section 36, and high pressure turbine section 40 comprise a high pressure spool of engine 10. Similarly, low pressure turbine shaft 18 may connect a fan section with a low pressure compressor section 37 (illustrated in FIG. 1) and a low pressure turbine section 41 of engine 10 (illustrated in FIG. 1). Together, these sections and components comprise a low pressure spool of engine 10. During operation of gas turbine engine 10, a gas flow may pass through a core flow path to rotate the high pressure and low pressure spools to extract energy from the gas flow and produce thrust. Additionally, gas flow may bypass the core flow path and rotate the fan to extract additional energy and thrust from the gas flow passing through a nacelle portion encasing engine 10.

In various embodiments, bearing compartment 12 circumscribes shafts 16 and 18 and bearings 14 and 14A and acts to contain a lubricant oil that is supplied to bearing compartment 12 to lubricate and cool the bearings 14 and 14A during operation of the gas turbine engine 10. In various embodiments, bearings 14 support high pressure compressor shaft 16 and low pressure turbine shaft 18 and allow shafts 16 and 18 to rotate relative to a stator engine casing. Similarly, bearings 14A may support a tower shaft and allow the tower shaft to rotate relative to the stator engine casing.

Cross-over housing 30 may, for example, support intershaft seal assembly 32. In various embodiments, intershaft seal assembly 32 controls a gas circulated between shafts 16 and 18 from to leak into the lubricating oil supplied portions of bearing compartment 12. Further, intershaft seal assembly 32 prevents the lubricating oil from leaking past an interface into the volume between the shafts 16 and 18. To accomplish this, intershaft seal assembly 32 comprises seals that are biased to ride against seats 34. In various embodiments, intershaft seal assembly 32 comprises a metallic material. In other embodiments, intershaft seal assembly 32 comprises a carbon material. Although described with reference to specific embodiments, intershaft seal assemblies of any suitable material are within the scope of the present disclosure.

Figure 3A:
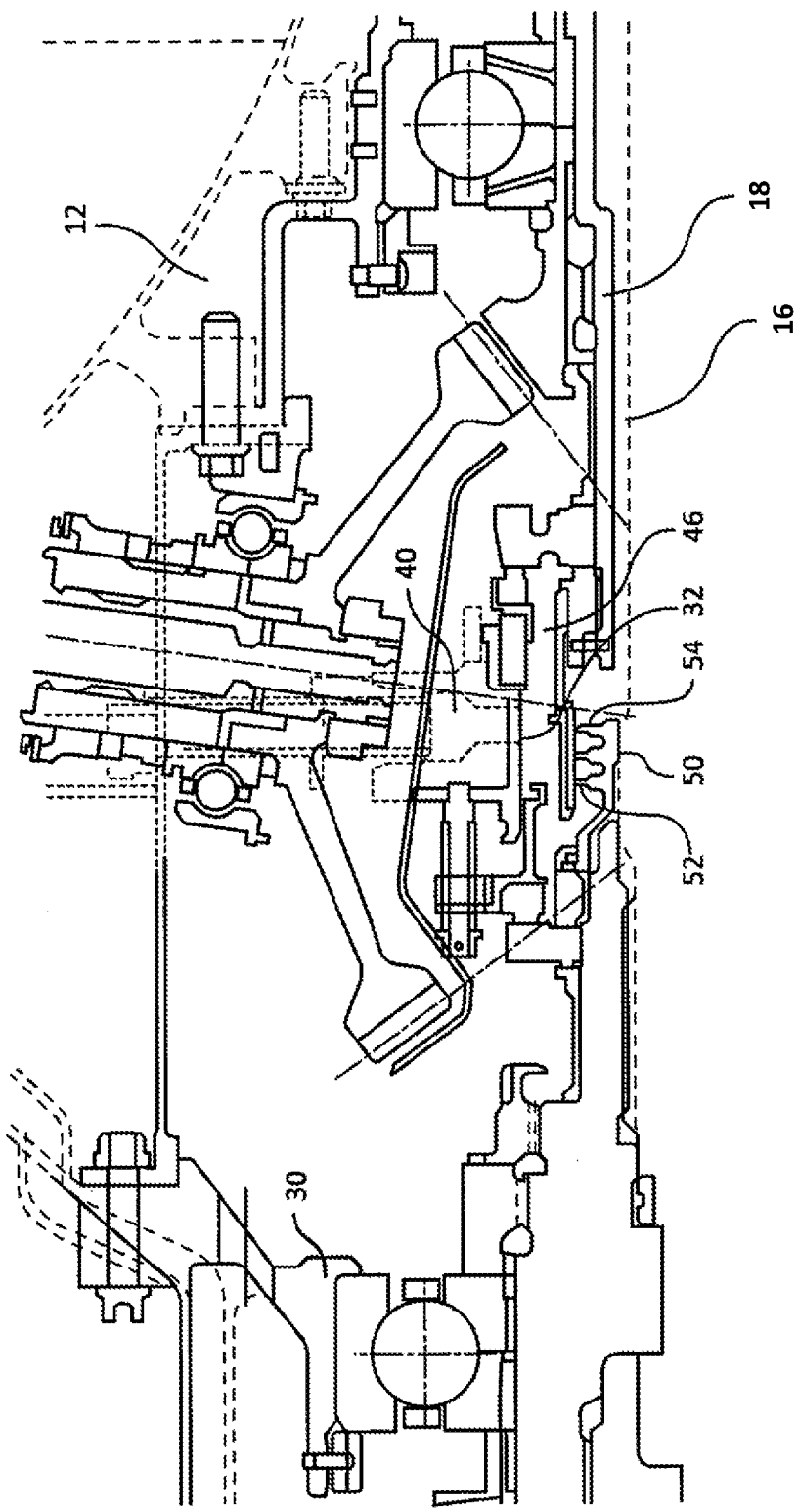
FIGS. 3A-3C illustrate cross sectional views of a portion of an aircraft engine in accordance with the present disclosure.
Figure 3B:
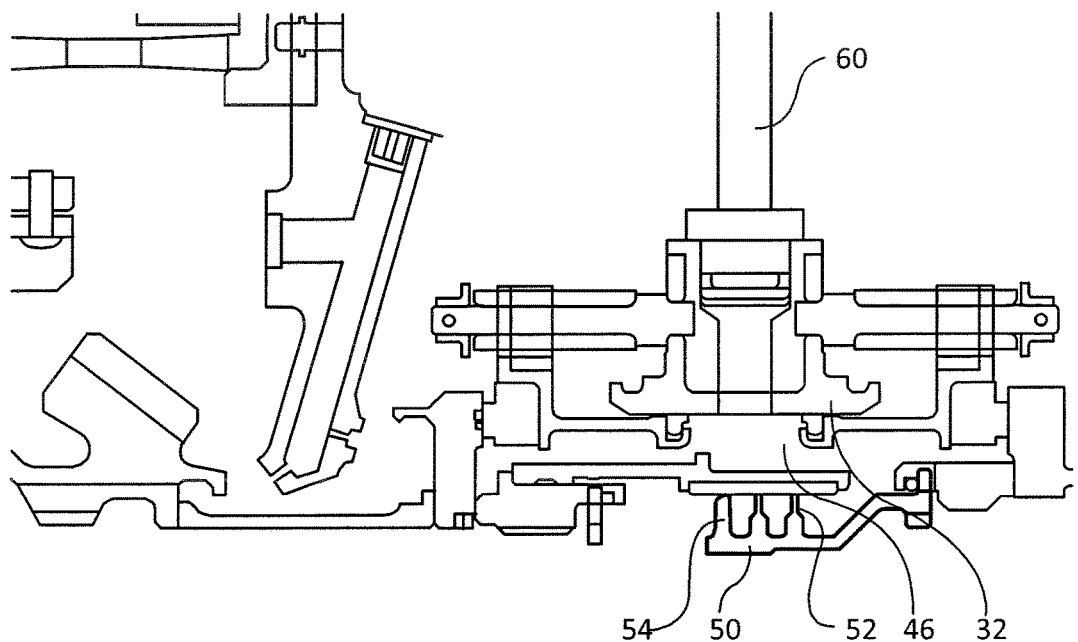
Figure 3C:
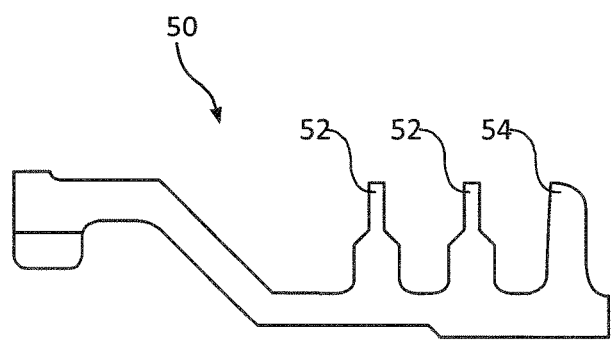

With initial reference to FIGS. 3A-3C, intershaft seal assembly 32 may comprise a buffer air inlet 60. In various embodiments, buffer air inlet 60 allows pressurized air to enter intershaft seal assembly 32. For example, air entering intershaft seal assembly 32 through buffer air inlet 60 may provide back pressure to annulus 46.

In various embodiments, bearing compartment 12 may further comprise a secondary seal 50. For example, lubricating oil from bearing compartment 12 may, undesirably, pass through intershaft seal assembly 32 and into annulus 46. Secondary seal 50 may, for example, be configured to prevent lubricating oil that has passed into annulus 46 from entering interface 48. Lubricating oil entering interface 48 may present a safety risk, as it may pass through interface 48, into the space between high pressure compressor shaft 16 and low pressure turbine shaft 18, and eventually accumulate in the turbine section.

In various embodiments, secondary seal 50 may comprise one or more knife edge seals 52. For example, in the illustrated embodiment, secondary seal 50 comprises two knife edge seals 52. However, any number of knife edge seals, including a single knife edge seal, is within the scope of the present disclosure.

Secondary seal 50 may further comprise, for example, one or more discouragers 54. For example, in the illustrated embodiment, secondary seal 50 comprises one discourager 54. However, any number of discouragers (including zero) is within the scope of the present disclosure. Further, any number of knife edge seals and discouragers may be combined to form secondary seal 50.

In various embodiments, with reference to FIG. 3B, annulus 46 may comprise an oil drain 62. For example, as illustrated in FIG. 3B, oil drain 62 may be in or close to the same axial location as buffer air inlet 60 and offset in the circumferential direction. In various embodiments, when sufficient lubricating oil has accumulated in annulus 46, lubricating oil may be removed from gas turbine engine 10 via oil drain 62. In various embodiments, buffer air from buffer air inlet 60 may assist in removal of lubricating oil from annulus 46 via oil drain 62 by providing back pressure to annulus 46 (as discussed previously).

It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A sealing system comprising:
an intershaft seal separating a bearing compartment from an annulus, wherein the intershaft seal comprises a buffer air inlet configured to provide back pressure to the annulus, wherein the intershaft seal is entirely radially outward of the annulus;
an outer shaft concentrically surrounding at least a portion of an inner shaft, wherein an interface between the outer shaft and the inner shaft leads into a volume defined between the outer shaft and the inner shaft; and
a secondary seal separating the annulus from the volume, wherein the secondary seal is radially inward of the intershaft seal;
wherein the intershaft seal forms a radially outermost wall of the annulus;
wherein the intershaft seal is configured to prevent lubricating oil in the bearing compartment from entering the annulus; and
wherein the secondary seal is configured to prevent lubricating oil, that undesirably passed through the intershaft seal from the bearing compartment into the annulus, from entering the volume via the interface.

2. The sealing system of claim 1, wherein the buffer air inlet comprises an opening defined in the radially outermost wall of the annulus the secondary seal comprises at least one knife edge seal.

3. The sealing system of claim 1, wherein the bearing compartment is separated from the volume by both the intershaft seal and the secondary seal.

4. The sealing system of claim 1, further comprising an oil drain located in the annulus.

5. The sealing system of claim 1, wherein the annulus is entirely radially inward of the intershaft seal and wherein the volume is radially inward of the annulus.

6. The sealing system of claim 1, wherein the outer shaft comprises a high pressure compressor shaft.

7. The sealing system of claim 1, wherein the inner shaft comprises a low pressure turbine shaft.

8. A gas turbine engine comprising:
an intershaft seal separating a bearing compartment from an annulus, wherein the intershaft seal comprises a buffer air inlet configured to provide back pressure to the annulus;
an outer shaft concentrically surrounding at least a portion of an inner shaft, wherein an interface between the outer shaft and the inner shaft leads into a volume defined between the outer shaft and the inner shaft; and
a secondary seal separating the annulus from the volume, wherein the secondary seal is radially inward of the intershaft seal;
wherein the intershaft seal forms a radially outermost wall of the annulus;
wherein the intershaft seal is configured to prevent lubricating oil in the bearing compartment from entering the annulus;
wherein the secondary seal is configured to prevent lubricating oil, that undesirably passed through the intershaft seal from the bearing compartment into the annulus, from entering the volume via the interface;
the annulus is entirely radially inward of the intershaft seal; and
the volume is radially inward of the annulus.

9. The gas turbine engine of claim 8, wherein the secondary seal comprises at least one of a knife edge seal and a discourager.

10. The gas turbine engine of claim 8, further comprising an oil drain located in the annulus.

11. The gas turbine engine of claim 8, wherein the outer shaft comprises a high pressure compressor shaft.

12. The gas turbine engine of claim 8, wherein the inner shaft comprises a low pressure turbine shaft.

13. A gas turbine engine comprising:
an intershaft seal separating a bearing compartment from an annulus, wherein the intershaft seal comprises a buffer air inlet configured to provide back pressure to the annulus, wherein the intershaft seal is entirely radially outward of the annulus;
an outer shaft concentrically surrounding at least a portion of an inner shaft, wherein an interface between the outer shaft and the inner shaft leads into a volume defined between the outer shaft and the inner shaft ; and
a secondary seal separating the annulus from the volume and comprising at least one knife edge seal, wherein the secondary seal is radially inward of the intershaft seal;
wherein the intershaft seal forms a radially outermost wall of the annulus;
wherein the intershaft seal is configured to prevent lubricating oil in the bearing compartment from entering the annulus; and
wherein the secondary seal is configured to prevent lubricating oil, that undesirably passed through the intershaft seal from the bearing compartment into the annulus, from entering the volume via the interface.

14. The gas turbine engine of claim 13, wherein the buffer air inlet comprises an opening defined in the radially outermost wall of the annulus.

15. The gas turbine engine of claim 13, further comprising an oil drain located in the annulus.

16. The gas turbine engine of claim 13, wherein the outer shaft comprises a high pressure compressor shaft and the inner shaft comprises a low pressure turbine shaft.

17. The gas turbine engine of claim 13, wherein the annulus is radially inward of the intershaft seal and wherein the volume is radially inward of the annulus.

\* \* \* \* \*